(12) United States Patent
Sannomiya et al.

(10) Patent No.: US 7,227,125 B2
(45) Date of Patent: Jun. 5, 2007

(54) ENCODER DEVICE

(75) Inventors: Hideaki Sannomiya, Atsugi (JP); Naosumi Waki, Atsugi (JP); Junichiro Tanaka, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 11/393,106

(22) Filed: Mar. 30, 2006

(65) Prior Publication Data
US 2007/0001108 A1 Jan. 4, 2007

(30) Foreign Application Priority Data
Jun. 29, 2005 (JP) ............... 2005-190136

(51) Int. Cl.
*G01D 5/34* (2006.01)
(52) U.S. Cl. .................... 250/231.13; 341/13
(58) Field of Classification Search ........... 250/231.13, 250/231.14, 231.16–231.18, 237 R, 214 R; 341/9, 13
See application file for complete search history.

(56) References Cited
U.S. PATENT DOCUMENTS
2004/0262498 A1* 12/2004 Shichi et al. ........... 250/214 R

FOREIGN PATENT DOCUMENTS
JP 6 18290 1/1994

* cited by examiner

*Primary Examiner*—Kevin Pyo
(74) *Attorney, Agent, or Firm*—Ladas & Parry LLP

(57) ABSTRACT

An encoder device includes a first array that includes first through fourth photodiodes adjacent to each other in an X direction, each having a length of X1; a second array that includes fifth through eighth photodiodes adjacent to each other in the X direction, each having a length of X1, and is adjacent to the first array in a Y direction but displaced by X1/2 in the X direction relative to the first array; a slit member that includes light transmitting sections and light shielding section arranged alternately, each having a length 2×X1, and is movable in the X direction; and a logic circuit that generates first and second detection signals from output signals of the first through fourth photodiodes and output signals of the fifth through eighth photodiodes, respectively, a phase of the second detection signal being shifted by a ¼ period of the first detection signal relative to the first detection signal.

5 Claims, 11 Drawing Sheets

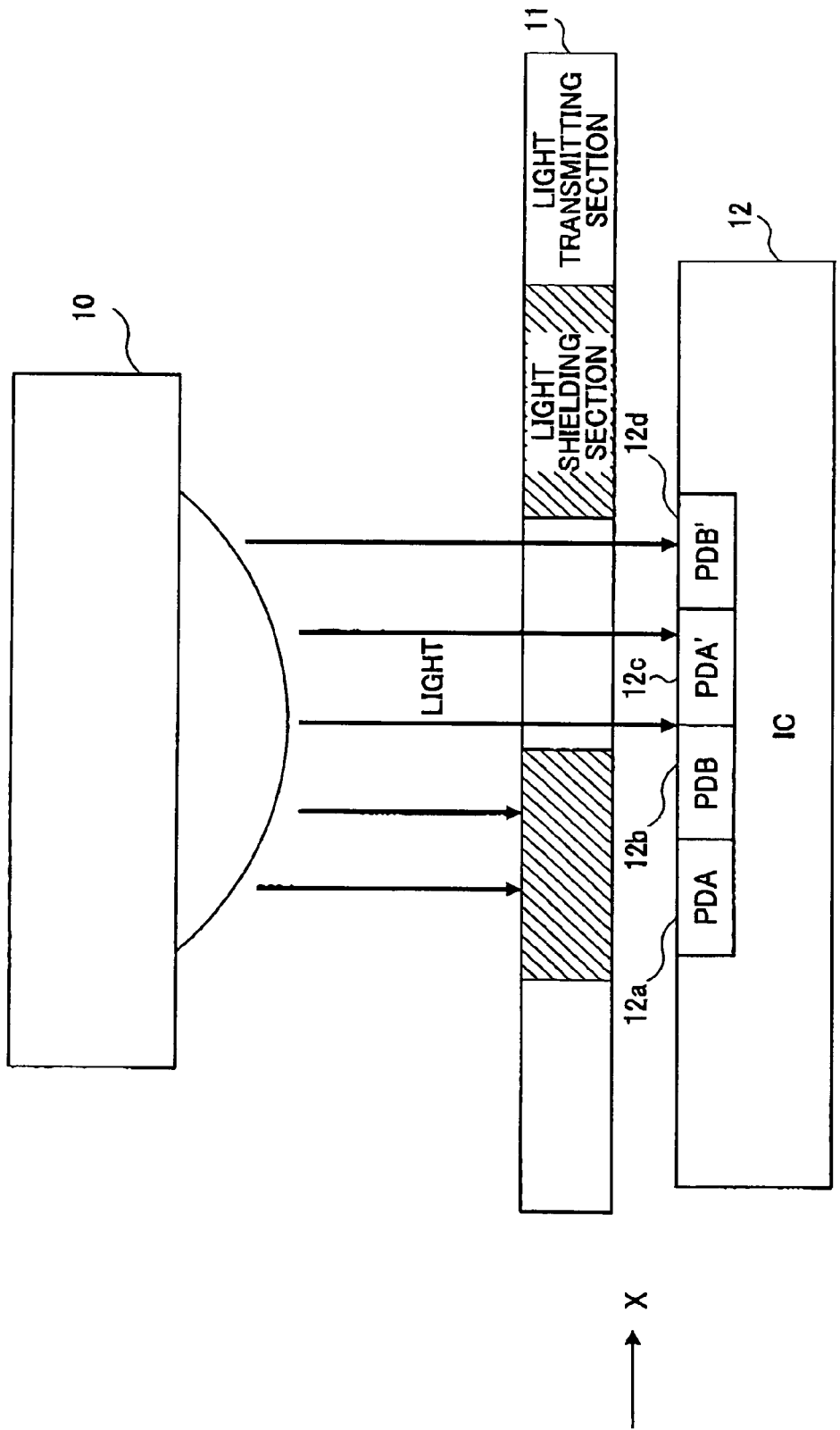

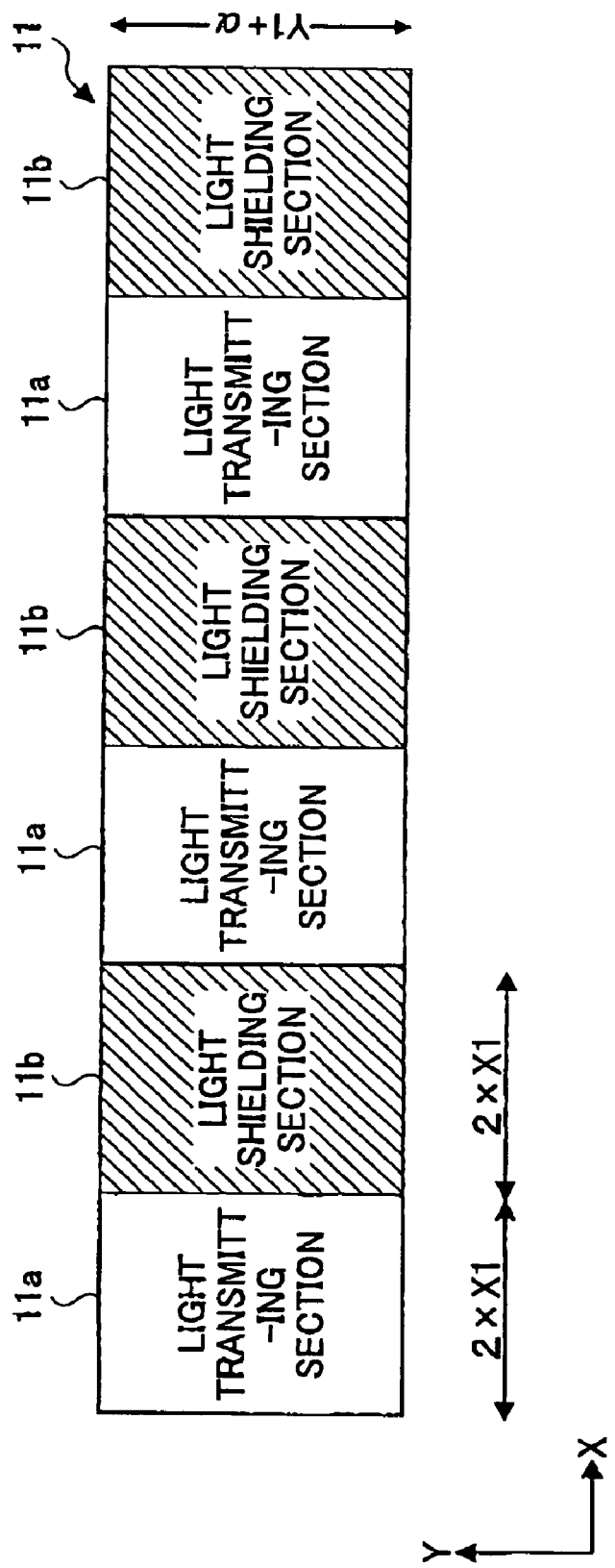

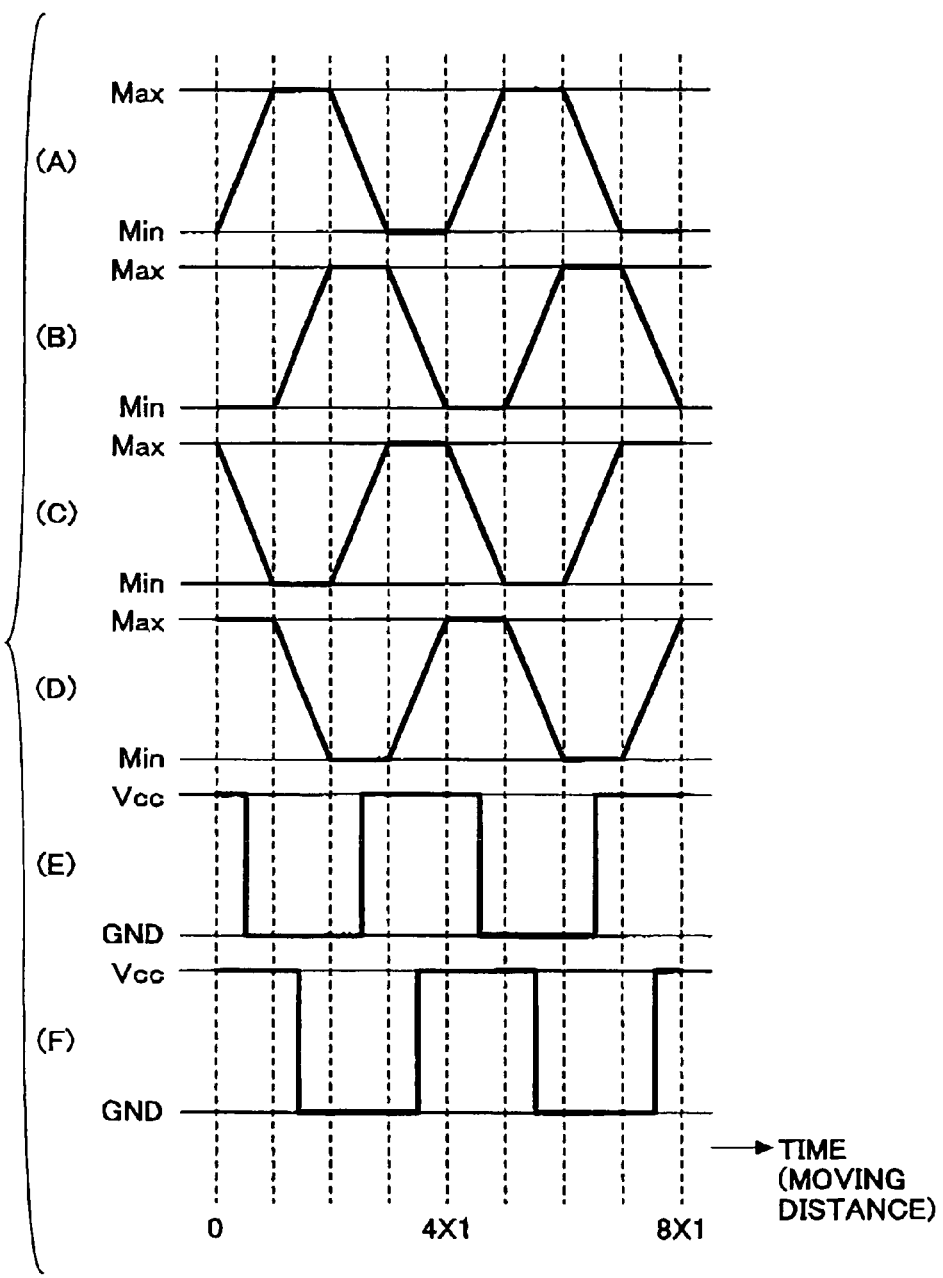

ENCODER DEVICE

BACKGROUND OF THE INVENTION

1. Field of the Invention

The present invention generally relates to an encoder device, and particularly relates to an encoder device that detects movement of an object to be measured and generates pulses corresponding to the movement of the object.

2. Description of the Related Art

Encoder devices for generating pulses corresponding to movements of objects to be measured have long been used as devices for detecting linear motions, rotary motion, etc. of objects to be measured and inputting the detection results into digital devices such as computers.

FIGS. 7A and 7B are a plan view and a side view, respectively, each schematically showing a configuration of a related art encoder device. With reference to FIGS. 7A and 7B, the encoder device comprises a light source 10, a slit member 11, and an integrated circuit 12.

The light source 10 is disposed spaced apart from and the integrated circuit 12. The slit member 11 is interposed between the light source 10 and the integrated circuit 12, and is movable with respect to the light source 10 and the integrated circuit 12 in an X direction (leftward and rightward). The slit member 11 is fixed to an object to be measured, and moves in the X direction along with motion of the object.

Referring to a plan view of FIG. 8, the integrated circuit 12 includes photodiodes 12a, 12b, 12c, and 12d which are adjacent to each other in the X direction. Each of the photodiodes 12a, 12b, 12c, and 12d has a length of X1 in the X direction and a width of Y1 in a Y direction. Light receiving areas of the photodiodes 12a, 12b, 12c, and 12d are equal to each other.

Referring to a plan view of FIG. 9, the slit member 11 includes light transmitting sections 11a and light shielding sections 11b which are alternately adjacent to each other in the X direction. Each of the light transmitting sections 11a and the light shielding sections 11b has a length of 2×X1 in the X direction and a width of Y1+α (>Y1) in the Y direction.

Referring back to FIG. 7A, output signals of the photodiodes 12a and 12c are compared by a comparator 13, and the comparison result is output as a detection signal from a terminal 14. Output signals of the photodiodes 12b and 12d are compared by a comparator 15, and the comparison result is output as a detection signal from a terminal 16.

When the slit member 11 moves rightward in the X direction with respect to the integrated circuit 12, the incident light intensities on the photodiodes 12a, 12b, 12c, and 12d change as shown in (A), (B), (C), and (D), respectively, of FIG. 10.

Thus, the output signal of the comparator 13 and the output signal of the comparator 15 change as shown in (E) and (F), respectively, of FIG. 10, wherein the waveform of the output signal of the comparator 15 is delayed by a ¼ period relative to the waveform of the output signal of the comparator 13. On the other hand, when the slit member 11 moves leftward in the X direction with respect to the integrated circuit 12, the waveform of the output signal of the comparator 15 is advanced by a ¼ period relative to the waveform of the output signal of the comparator 13.

Incidentally, Japanese Patent Laid-Open Publication No. 6-18290 discloses an encoder device comprising a member that moves in a direction of an array of openings, a light receiving element that detects lights passing through the openings, and a signal processor that generates output pulses corresponding to detection outputs from light receivers of the light receiving element.

The resolution of the related art encoder device shown in FIGS. 7A and 7B corresponds to the number of slits per unit distance in the X direction, which depends on the length 2×X1 in the X direction of each of the light transmitting sections 11a and the light shielding sections 11b of the slit member 11 and the length X1 in the X direction of each of the photodiodes 12a–12d.

Due to this configuration, the resolution of the encoder device cannot have a higher resolution than when the length 2×X1 in the X direction of each of the light transmitting sections 11a and the light shielding sections 11b of the slit member 11 is reduced as far as possible with manufacturing technology.

SUMMARY OF THE INVENTION

In view of the foregoing, the present invention is directed to an encoder device with improved resolution.

According to an aspect of the present invention, there is provided an encoder device comprising a first array that includes first through fourth photodiodes adjacent to each other in an X direction, each of the first through fourth photodiodes having a length of X1 in the X direction; a second array that includes fifth through eighth photodiodes adjacent to each other in the X direction, and is adjacent to the first array in a Y direction perpendicular to the X direction but displaced by X1/2 in the X direction relative to the first array, each of the fifth through eighth photodiodes having a length of X1 in the X direction; a slit member that includes light transmitting sections and light shielding sections alternately arranged, and is movable in the X direction, each of the light transmitting sections and the light shielding sections having a length of 2×X1 in the X direction; and a logic circuit that generates a first detection signal from output signals of the first through fourth photodiodes that have received lights passing through the light transmitting sections, and a second detection signal from output signals of the fifth through eighth photodiodes that have received the lights passing through the light transmitting sections, a phase of the second detection signal being shifted by a ¼ period of the first detection signal relative to the first detection signal. With this configuration, the resolution of the encoder device can be improved.

It is preferable that each of the first through eighth photodiodes of the above described encoder device have a width of Y1 in the Y direction, and each of the light transmitting sections and the light shielding sections have a width greater than 2×Y1 in the Y direction.

It is also preferable that the logic circuit of the above described encoder device include a first circuit that generates the first detection signal by performing an exclusive OR operation on a signal representing a result of a comparison between the output signal of the first photodiode and the output signal of the third photodiode and a signal representing a result of a comparison between the output signal of the second photodiode and the output signal of the fourth photodiode; and a second circuit that generates the second detection signal by performing an exclusive OR operation on a signal representing a result of a comparison between the output signal of the fifth photodiode and the output signal of the seventh photodiode and a signal representing a result of a comparison between the output signal of the sixth photodiode and the output signal of the eighth photodiode.

It is also preferable that plural pairs of the first array and the second array be provided adjacent to each other in the X direction in the above described encoder device.

According to another aspect of the present invention, there is provided an encoder device comprising a photodiode group that includes n (n being an integer equal to or greater than 3) photodiode arrays adjacent to each other in a Y direction, each of the photodiode arrays including four photodiodes adjacent to each other in an X direction, each of the photodiodes having a length of X1 in the X direction, wherein any two adjacent of the photodiode arrays are displaced by X1/n in the X direction relative to one another; a slit member that includes light transmitting sections and light shielding sections alternately arranged, and is movable in the X direction, each of the light transmitting sections and the light shielding sections having a length of 2×X1 in the X direction; and a logic circuit that generates first through n th detection signals from output signals of the n photodiode arrays that have received lights passing through the transmitting sections, a phase shift between the detection signals of the any two adjacent photodiode arrays being a 1/(2×n) period. With this configuration, the resolution of the encoder device can be further improved.

BRIEF DESCRIPTION OF THE DRAWINGS

FIGS. 7A and 7B are a plan view and a side view, respectively, each schematically showing a configuration of a related art encoder device;

FIG. 9 is a plan view schematically showing a related art slit member; and

FIG. 10 is a signal waveform chart showing waveforms generated in the encoder device of FIGS. 7A and 7B.

DETAILED DESCRIPTION OF THE PREFERRED EMBODIMENT

The following describes preferred embodiments of the present invention with reference to the accompanying drawings.

Figure 1:
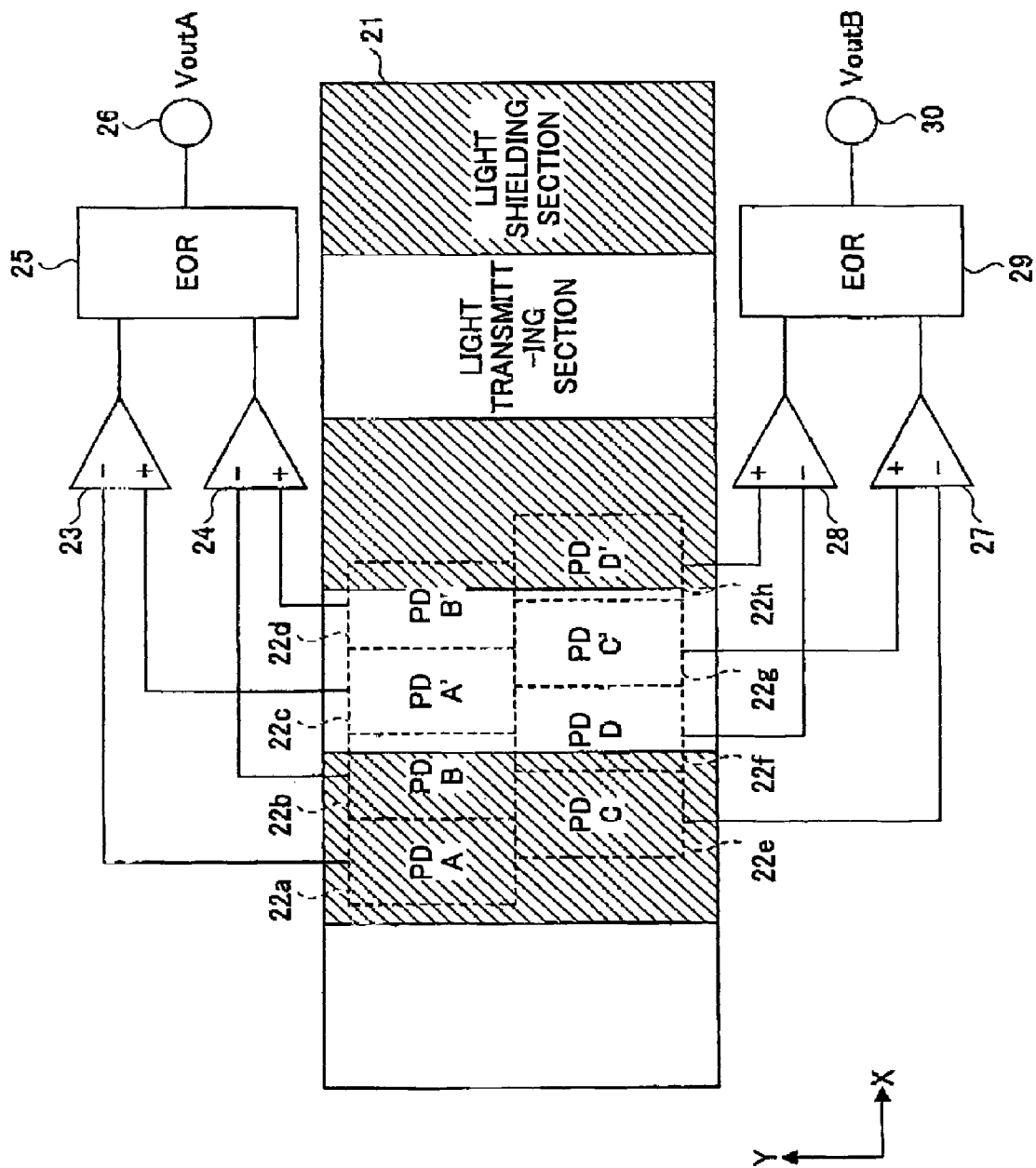
FIG. 1 is a plan view schematically showing a configuration of an encoder device according to an embodiment of the present invention.

FIG. 1 is a plan view schematically showing a configuration of an encoder device according to an embodiment of the present invention. Referring to FIG. 1, the encoder device comprises a light source (not shown), a slit member 21, and an integrated circuit 22.

Figure 7A:
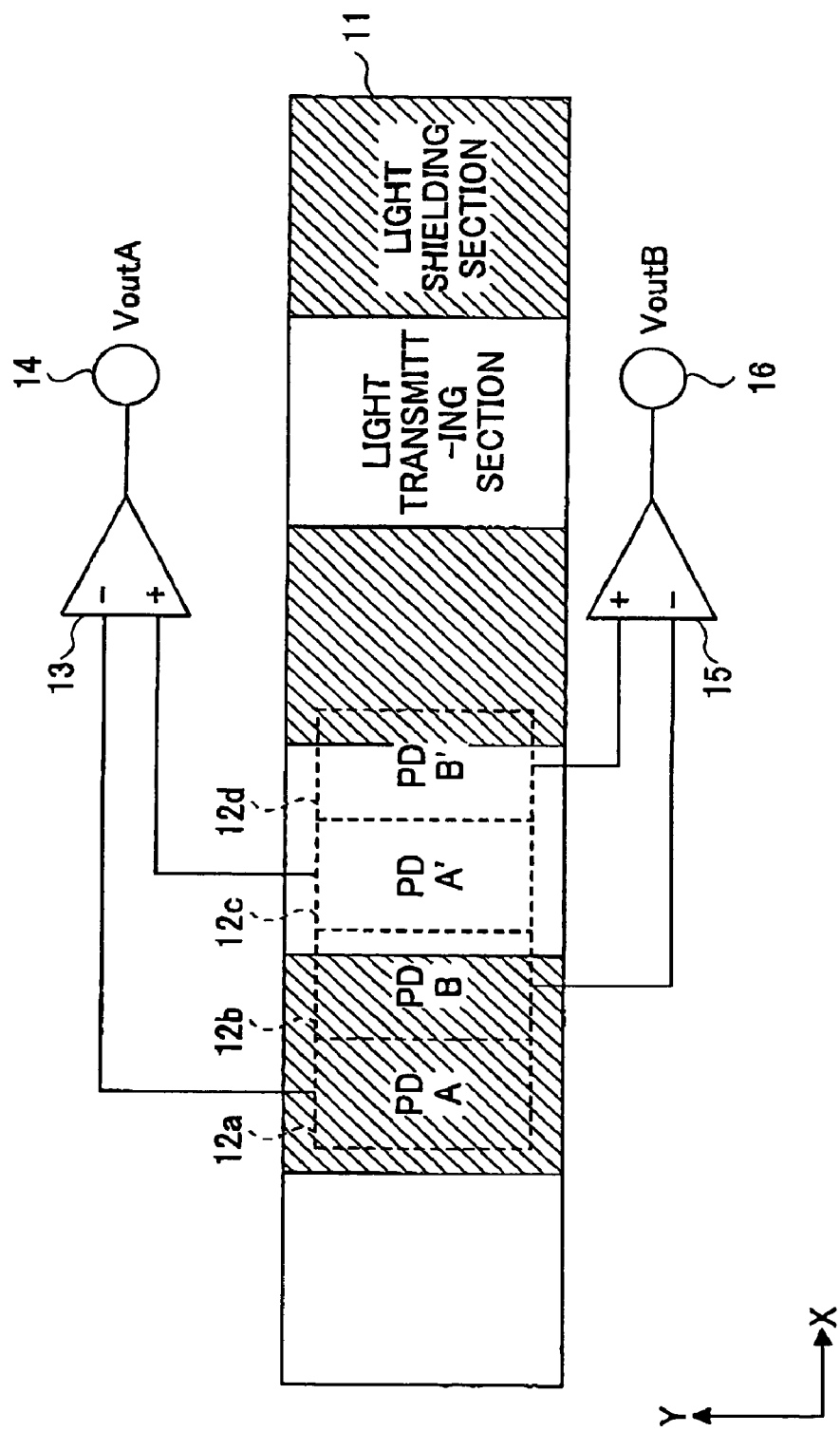
Figure 8:
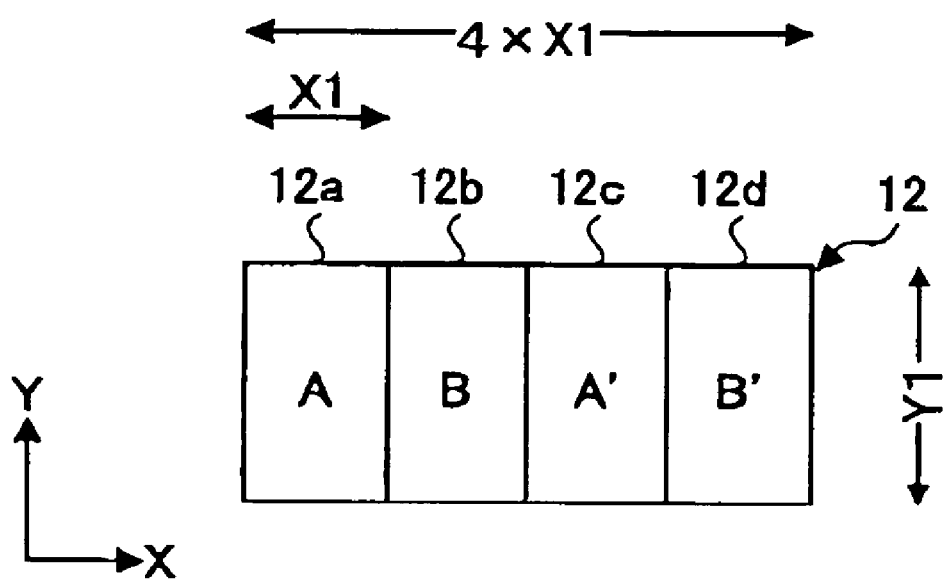
FIG. 8 is a plan view schematically showing a related art integrated circuit.

The light source is disposed spaced apart from and facing the integrated circuit 22. The slit member 21 is interposed between the light source and the integrated circuit 22, and is movable with respect to the light source and the integrated circuit 22 in an X direction (leftward and rightward). The slit member 21 is fixed to an object to be measured, and moves in the X direction along with linear motion, rotational motion, etc., of the object. This configuration is the same as the configuration of the related art encoder device shown in FIG. 7B.

Figure 2:
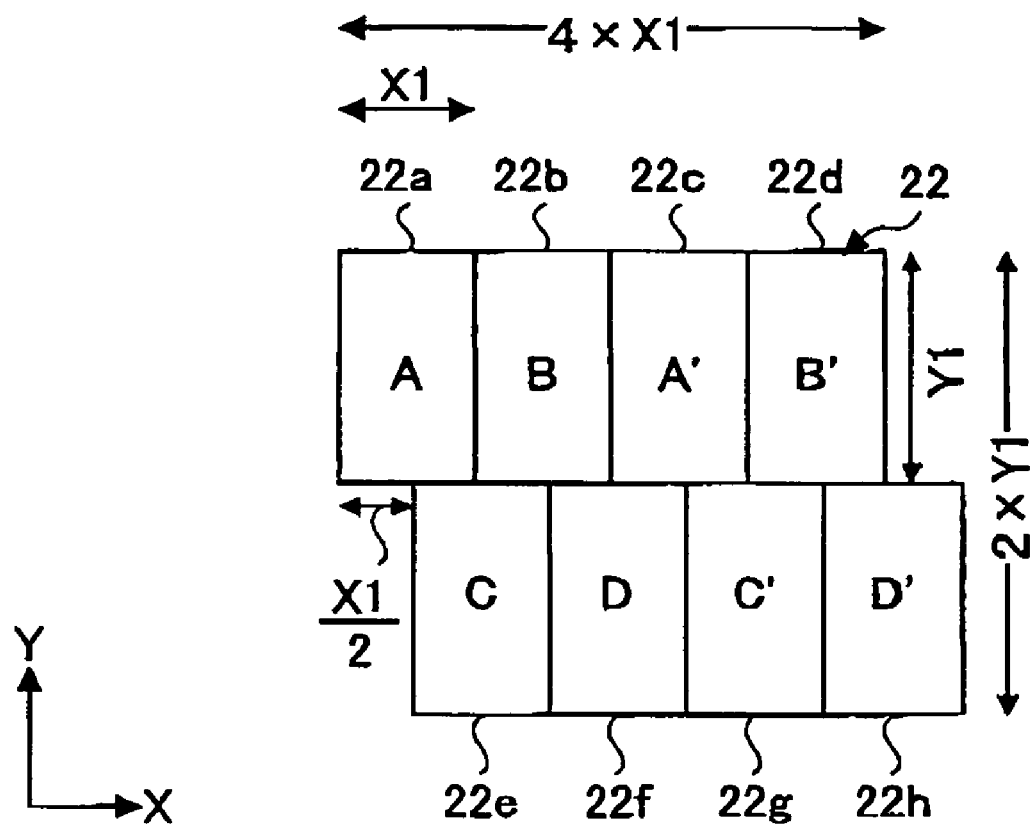
FIG. 2 is a plan view schematically showing an integrated circuit according to an embodiment of the present invention.

Referring to a plan view of FIG. 2, the integrated circuit 22 includes rectangular photodiodes 22a, 22b, 22c, and 22d which are adjacent to each other in the X direction, and rectangular photodiodes 22e, 22f, 22g, and 22h which are adjacent to each other in the X direction (the X direction being perpendicular to a Y direction). The array of the photodiodes 22e, 22f, 22g, and 22h is adjacent to the array of the photodiodes 22a, 22b, 22c, and 22d in the Y direction, and is displaced rightward (or leftward) in the X direction by X1/2 relative to the array of the photodiodes 22a, 22b, 22c, and 22d.

Each of the photodiodes 22a–22h has a length of X1 in the X direction and a width of Y1 in the Y direction. Light receiving areas of the photodiodes 22a–22h are equal to each other. If the total length 4×X1 of the photodiodes 22a, 22b, 22c, and 22d is defined as one period, the displacement X1/2 is a ⅛ period.

Figure 3:
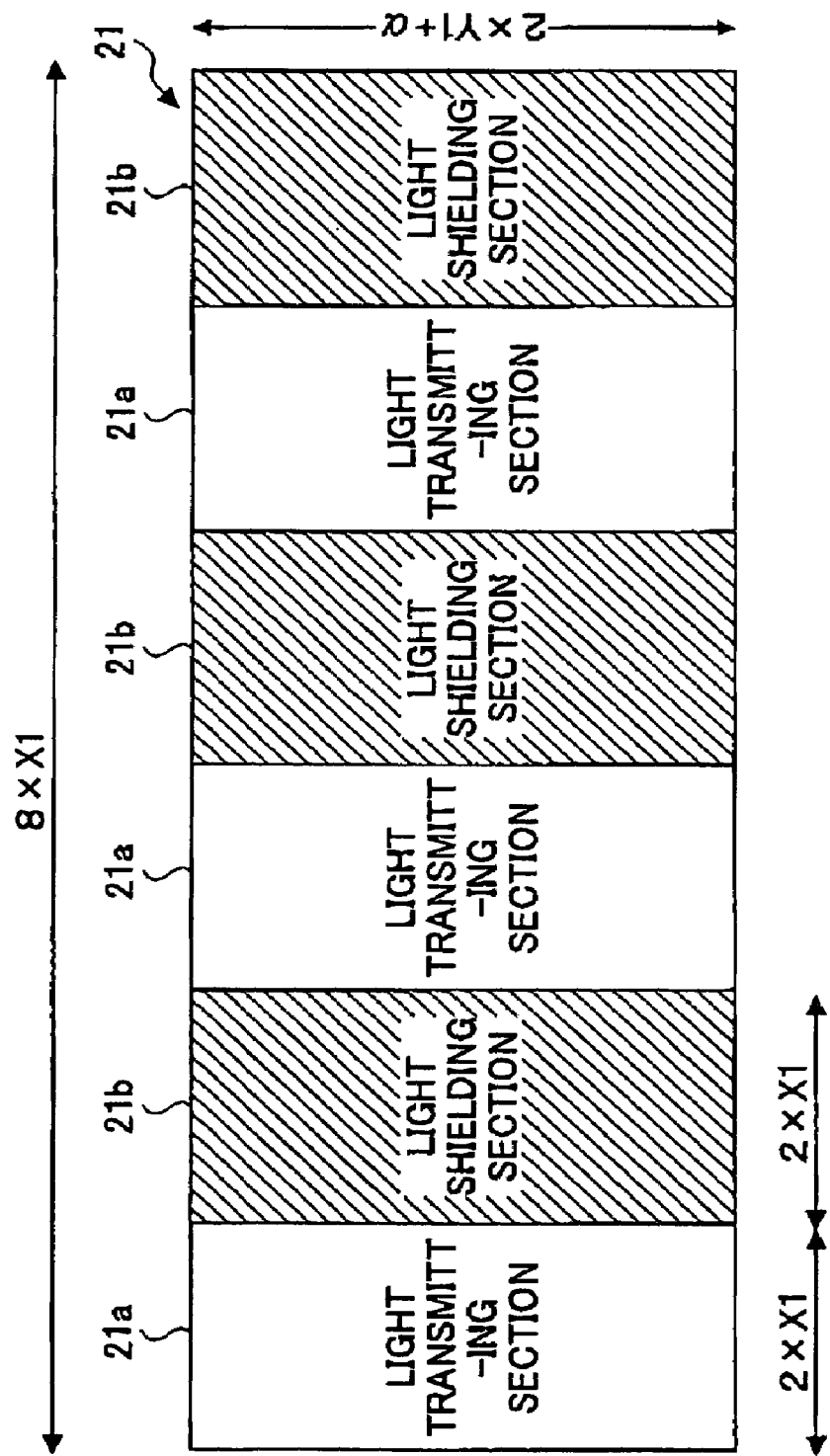
FIG. 3 is a plan view schematically showing a slit member according to an embodiment of the present invention.

Referring to a plan view of FIG. 3, the slit member 21 includes light transmitting sections 21a and light shielding sections 21b which are alternately adjacent to each other in the X direction. Each of the light transmitting sections 21a and the light shielding sections 21b has a length of 2×X1 in the X direction and a width of 2×Y1+α (>2×Y1) in the Y direction.

Referring back to FIG. 1, output signals of the photodiodes 22a and 22c are compared by a comparator 23, and the comparison result is output to an exclusive OR circuit (EOR) 25. Output signals of the photodiodes 22b and 22d are compared by a comparator 24, and the comparison result is output to the exclusive OR circuit 25. The exclusive OR circuit 25 performs an exclusive OR operation on the output signals of the comparators 23 and 24, and outputs the operation result as a detection signal from a terminal 26.

Output signals of the photodiodes 22e and 22g are compared by a comparator 27, and the comparison result is output to an exclusive OR circuit 29. Output signals of the photodiodes 22f and 22h are compared by a comparator 28, and the comparison result is output to the exclusive OR circuit 29. The exclusive OR circuit 29 performs an exclusive OR operation on the output signals of the comparators 27 and 28, and outputs the operation result as a detection signal from a terminal 30.

Figure 4:
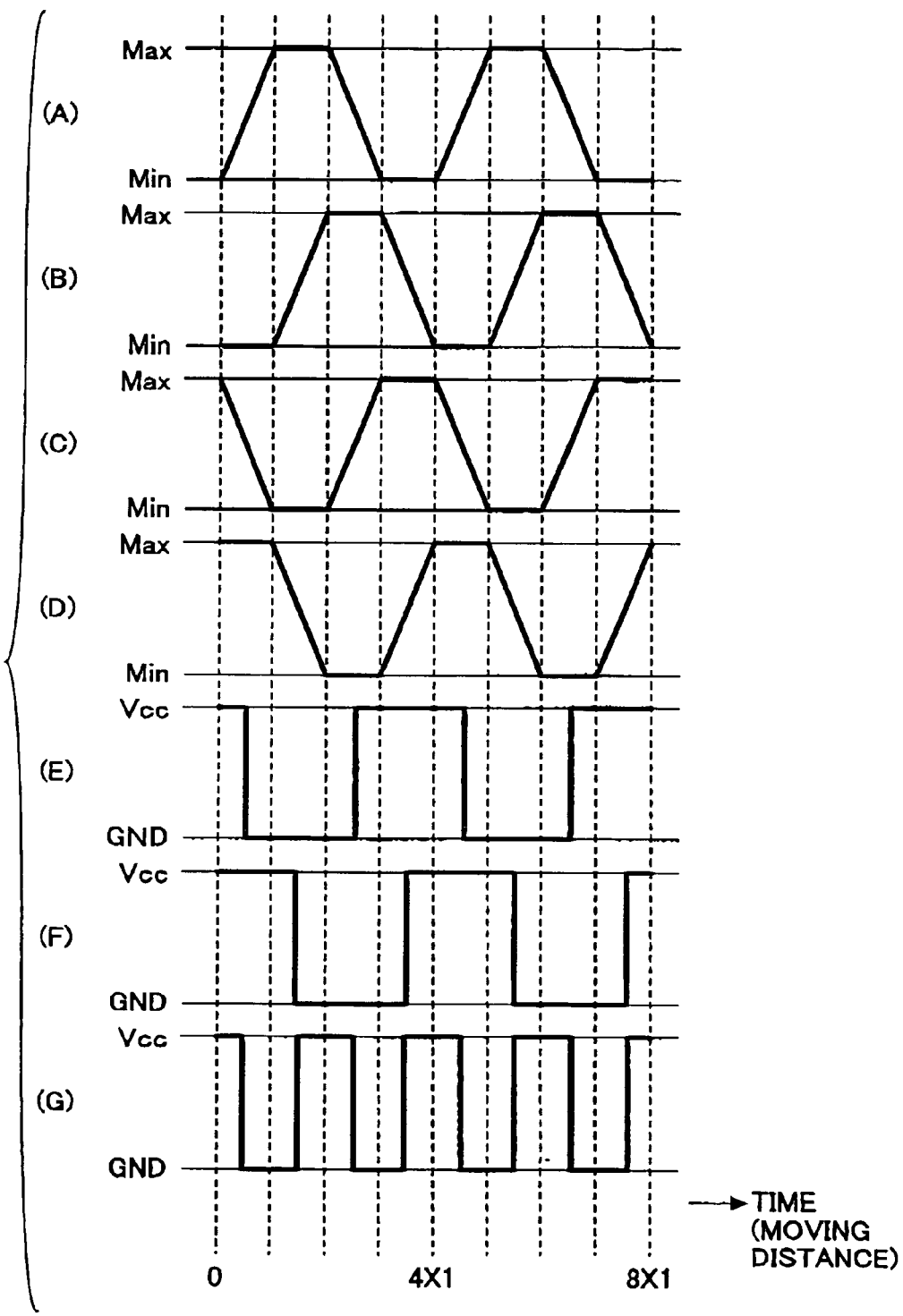
FIG. 4 is a signal waveform chart showing waveforms generated in the encoder device of FIG. 1.
Figure 5:
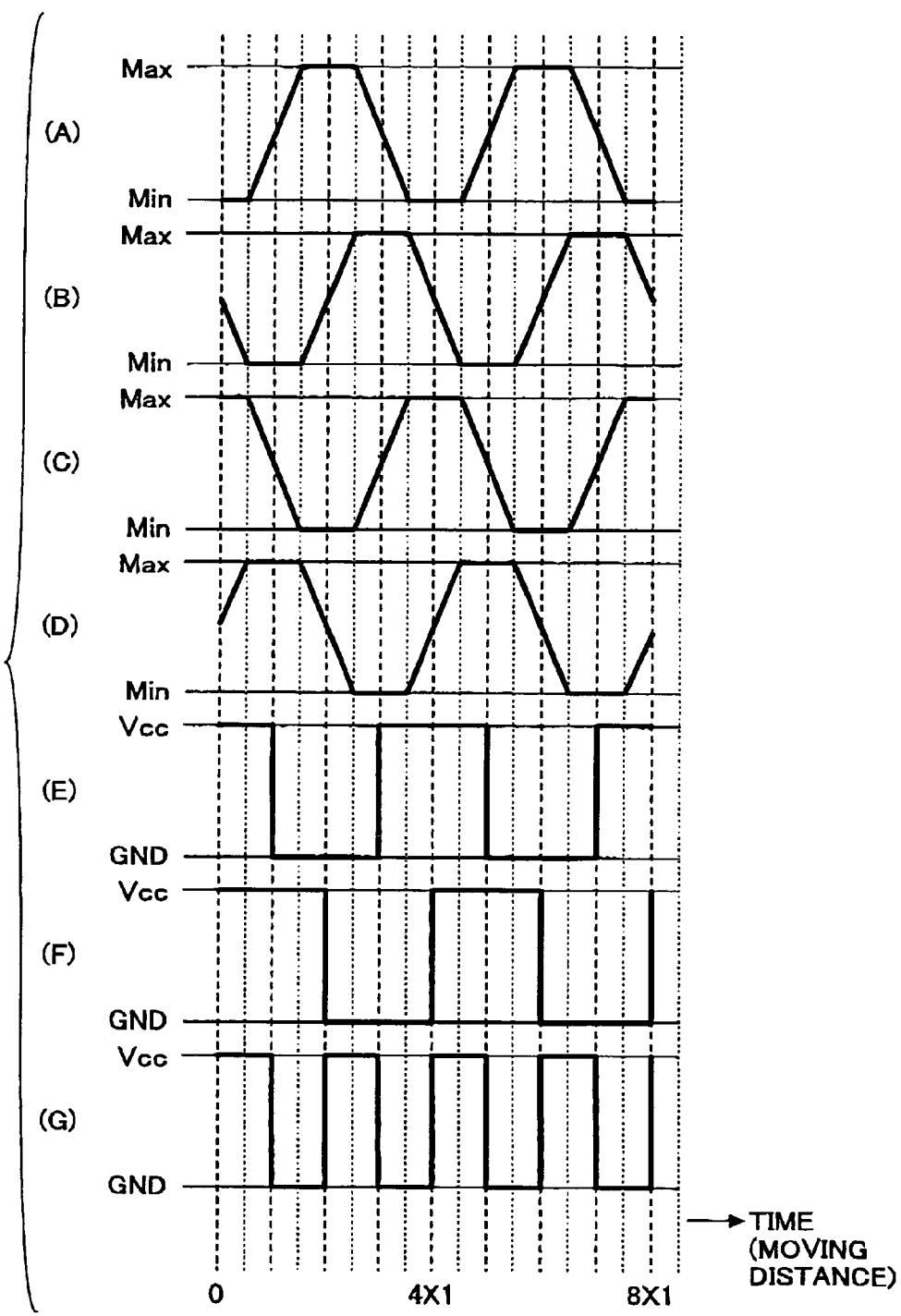
FIG. 5 is a signal waveform chart showing waveforms generated in the encoder device of FIG. 1.

When the slit member 21 moves rightward in the X direction with respect to the integrated circuit 22, the incident light intensities on the photodiodes 22a, 22b, 22c, and 22d change as shown in (A), (B), (C), and (D), respectively, of FIG. 4. Meanwhile, the incident light intensities on the photodiodes 22e, 22f, 22g, and 22h change as shown in (A) (B), (C), and (D), respectively, of FIG. 5. For example, the incident light intensity on the photodiode 22e shown in (A) of FIG. 5 changes with a delay of a ⅛ period relative to the incident light intensity on the photodiode 22a shown in (A) of FIG. 4. Similarly, the waveforms shown in (B)–(D) of FIG. 5 are delayed by a ⅛ period relative to the waveforms shown in (B)–(D), respectively, of FIG. 4. These delays occur because the array of the photodiodes 22e, 22f, 22g, and 22h is displaced rightward (or leftward) in the X direction by X1/2 relative to the array of the photodiodes 22a, 22b, 22c, and 22d.

Thus, the output signal of the comparator 23 and the output signal of the comparator 24 change as shown in (E) and (F), respectively, of FIG. 4, wherein the waveform of the output signal of the comparator 24 is delayed by a ¼ period relative to the waveform of the output signal of the of the comparator 23. The period of the output signal of the exclusive OR circuit 25 shown in (G) of FIG. 4 is a half of the period of the output signal of the comparator 23.

The output signal of the comparator 27 and the output signal of the comparator 28 change as shown in (E) and (F), respectively, of FIG. 5, wherein the waveform of the output signal of the comparator 28 is delayed by a ¼ period relative to the waveform of the output signal of the of the comparator 27. The period of the output signal of the exclusive OR circuit 29 shown in (G) of FIG. 5 is a half of the period of the comparator 27 output. The waveform of the output signal of the exclusive OR circuit 29 is delayed by a ¼ of the period of the output signal of the exclusive OR circuit 25 (i.e. a ⅛ of the period of the comparator output).

On the other hand, when the slit member 21 moves leftward in the X direction with respect to the integrated circuit 22, the waveform of the output signal of the exclusive OR circuit 29 is advanced by a ¼ of the period of the output signal of the of the exclusive OR circuit 25 (i.e. a ⅛ of the period of the comparator output).

The period of the detection signals output from the terminals 26 and 30 is a half of the period of the detection signals of the related art encoder device. That is, while the length 2×X1 in the X direction of each of the light transmitting sections 21a and the light shielding sections 21b of the slit member 21 and the length X1 in the X direction of each of the photodiodes 22a–22h are equal those in the related art encoder device, the resolution of the encoder of this embodiment is doubled from the resolution of the related art encoder device.

Figure 6:
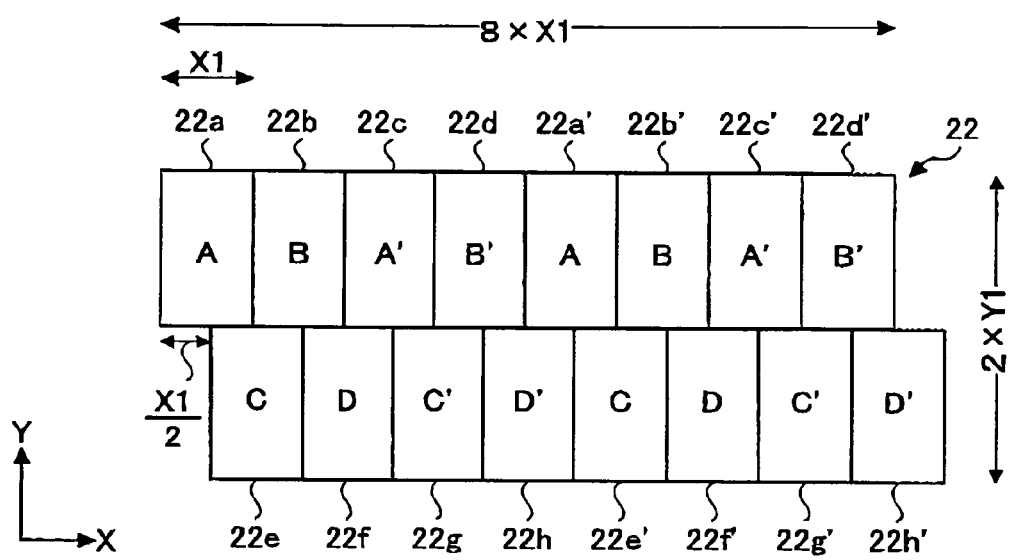
FIG. 6 is a plan view schematically showing an integrated circuit according to an embodiment of the present invention.

In an alternative embodiment shown in a plan view of FIG. 6, photodiodes 22a, 22b, 22c, 22d, 22a', 22b', 22c', and 22d' are provided adjacent to each other in the X direction, and photodiodes 22e, 22f, 22g, 22h, 22e', 22f', 22g', and 22h' are provided adjacent to each other in the X direction. The array of the photodiodes 22e, 22f, 22g, 22h, 22e', 22f', 22g', and 22h' is adjacent to the array of the photodiodes 22a, 22b, 22c, 22d, 22a', 22b', 22c', and 22d' in the Y direction, and is displaced rightward in the X direction by X1/2 relative to the array of the photodiodes 22a, 22b, 22c, 22d, 22a', 22b', 22c', and 22d'.

Each of the photodiodes 22a—22h and 22a'–22h' has a length of X1 in the X direction and a width of Y1 in the Y direction. Light receiving areas of the photodiodes 22a–22h and 22a'–22h' are equal to each other. Outputs of the photodiodes 22a'–22h' are added to outputs of the corresponding photodiodes 22a–22h and then output to the corresponding comparators 23, 24, 27, and 28. This configuration can reduce variation of the incident light intensities due to difference in position of photodiodes.

While two photodiode arrays, each including four photodiodes adjacent to each other in the X, are provided adjacent to each other in the Y direction in a manner that one of the photodiode arrays is displaced rightward (or leftward) in the X direction by X1/2 relative to the other photodiode array in the embodiment shown in FIG. 2, n (n being an integer equal to or greater than 3) photodiode arrays, each including four photodiodes adjacent to each other in the X direction, may be provided adjacent to each other in the Y direction in a manner that any two adjacent of the photodiode arrays are displaced by X1/n in the X direction relative to one another so as to form a photodiode group.

If n photodiode arrays adjacent to each other in the Y direction are provided, a first comparator for comparing outputs of first and third photodiodes, a second comparator for comparing outputs of second and fourth photodiodes, and an exclusive OR circuit for performing an exclusive OR operation on outputs of the first and second comparators are provided for each of the n photodiode arrays. The phase shift between outputs of, e.g., the first photodiodes of the any two adjacent photodiode arrays is a 1/(4×n) period, and the phase shift between detection signals output from the exclusive OR circuits of two adjacent photodiode arrays is a 1/(2×n) period. Accordingly, the resolution of the encoder device is increased by n times without changing the length X1 in the X direction of each photodiode.

It is to be noted that the photodiodes 22a–22d correspond to first–fourth photodiodes in the appended claims; the photodiodes 22e–22h correspond to fifth–eighth photodiodes; the comparators 23, 24, 27 and 28, and the exclusive OR circuits 25 and 29 correspond to a logic circuit; the comparators 23 and 24, and the exclusive OR circuit 25 correspond to a first circuit; and the comparators 27 and 28, and the exclusive OR circuit 29 correspond to a second circuit.

The present application is based on Japanese Priority Application No. 2005-190136 filed on Jun. 29, 2005, with the Japanese Patent Office, the entire contents of which are hereby incorporated by reference.

What is claimed is

1. An encoder device comprising:
  a first array that includes first through fourth photodiodes adjacent to each other in an X direction, each of the first through fourth photodiodes having a length of X1 in the X direction;
  a second array that includes fifth through eighth photodiodes adjacent to each other in the X direction, and is adjacent to the first array in a Y direction perpendicular to the X direction but displaced by X1/2 in the X direction relative to the first array, each of the fifth through eighth photodiodes having a length of X1 in the X direction;
  a slit member that includes light transmitting sections and light shielding sections alternately arranged, and is movable in the X direction, each of the light transmitting sections and the light shielding sections having a length of 2×X1 in the X direction; and
  a logic circuit that generates a first detection signal from output signals of the first through fourth photodiodes that have received lights passing through the light transmitting sections, and a second detection signal from output signals of the fifth through eighth photodiodes that have received the lights passing through the light transmitting sections, a phase of the second detection signal being shifted by a ¼ period of the first detection signal relative to the first detection signal.

2. The encoder device as claimed in claim 1,
  wherein each of the first through eighth photodiodes has a width of Y1 in the Y direction; and
  each of the light transmitting sections and the light shielding sections has a width greater than 2×Y1 in the Y direction.

3. The encoder device as claimed in claim 1, wherein the logic circuit includes
  a first circuit that generates the first detection signal by performing an exclusive OR operation on a signal representing a result of a comparison between the output signal of the first photodiode and the output signal of the third photodiode and a signal representing a result of a comparison between the output signal of the second photodiode and the output signal of the fourth photodiode; and
  a second circuit that generates the second detection signal by performing an exclusive OR operation on a signal representing a result of a comparison between the output signal of the fifth photodiode and the output signal of the seventh photodiode and a signal representing a result of a comparison between the output signal of the sixth photodiode and the output signal of the eighth photodiode.

4. The encoder device as claimed in claim 1,
wherein a plurality of pairs of the first array and the second array are provided adjacent to each other in the X direction.

5. An encoder device comprising:
a photodiode group that includes n (n being an integer equal to or greater than 3) photodiode arrays adjacent to each other in a Y direction, each of the photodiode arrays including four photodiodes adjacent to each other in an X direction, each of the photodiodes having a length of X1 in the X direction, wherein any two adjacent of the photodiode arrays are displaced by X1/n in the X direction relative to one another;

a slit member that includes light transmitting sections and light shielding sections alternately arranged, and is movable in the X direction, each of the light transmitting sections and the light shielding sections having a length of 2×X1 in the X direction; and a logic circuit that generates first through n th detection signals from output signals of the n photodiode arrays that have received lights passing through the transmitting sections, a phase shift between the detection signals of the any two adjacent photodiode arrays being a 1/(2×n) period.

* * * * *